US007266251B2

(12) United States Patent
Rowe

(10) Patent No.: US 7,266,251 B2
(45) Date of Patent: Sep. 4, 2007

(54) METHOD AND APPARATUS FOR GENERATING MODELS OF INDIVIDUALS

(76) Inventor: Simon Michael Rowe, c/o Canon Research Centre Europe Limited, The Braccans, London Road, Bracknell, Berkshire (GB) RG12 2XH ( * ) Notice: Subject to any disclaimer, the term of this patent is extended or adjusted under 35 U.S.C. 154(b) by 716 days.

(21) Appl. No.: 10/301,748

(22) Filed: Nov. 22, 2002

(65) Prior Publication Data

US 2003/0099409 A1     May 29, 2003

(30) Foreign Application Priority Data

Nov. 23, 2001 (GB) ................................ 0128158.3

(51) Int. Cl.
*G06K 9/36* (2006.01)
*G06K 9/00* (2006.01)

(52) U.S. Cl. ..................................................... 382/285

(58) Field of Classification Search ................ 382/285, 382/190, 199, 154; 345/420, 426, 582
See application file for complete search history.

(56) References Cited

U.S. PATENT DOCUMENTS

| 6,188,776 B1 | 2/2001 | Covell et al. ................ 382/100 |
| 6,421,459 B1 * | 7/2002 | Rowe ........................ 382/154 |
| 6,434,278 B1 * | 8/2002 | Hashimoto .................. 382/285 |
| 6,647,146 B1 * | 11/2003 | Davison et al. ............. 382/199 |
| 6,668,082 B1 * | 12/2003 | Davison et al. ............. 382/190 |
| 6,740,846 B1 * | 5/2004 | Troitski et al. ........ 219/121.69 |
| 6,862,374 B1 * | 3/2005 | Nagai et al. ................ 382/285 |
| 6,867,772 B2 * | 3/2005 | Kotcheff et al. ............ 345/420 |
| 6,914,599 B1 * | 7/2005 | Rowe et al. ................ 345/420 |
| 6,956,569 B1 * | 10/2005 | Roy et al. .................... 345/426 |
| 7,006,102 B2 * | 2/2006 | Rowe .......................... 345/582 |
| 2002/0171648 A1 | 11/2002 | Inoue et al. ................ 345/474 |

FOREIGN PATENT DOCUMENTS

| EP | 1 039 417 A1 | 9/2000 |
| EP | 1260940 | 5/2002 |
| JP | 2001-229400 | 2/2000 |
| JP | 2001-312743 | 11/2001 |

OTHER PUBLICATIONS

"Phantom Faces for Faces Analysis," Wiskott, Proc. of the 3rd Joint Symposium on Neural Computation, Pasadena, CA, Jun. 1996, vol. 6, pp. 46-52.
"Active Appearance Models," Cootes, et al., Proc. European Conference on Computer Vision 1998, vol. 2, pp. 484-498.
"A Morphable Model for the Synthesis of 3D Faces," Blanz, et al., SIGGRAPH 99, Los Angeles, CA, Aug. 8-13, 1999.

* cited by examiner

*Primary Examiner*—Amir Alavi
(74) *Attorney, Agent, or Firm*—Fitzpatrick, Cella, Harper & Scinto

(57) ABSTRACT

A communications system is described in which a plurality of mobile phones are provided, each including means for generating a user interface for enabling users to identify points in images as feature points. All of the phones are then operable to utilise points identified by users to generate 3D models of individuals in the images. The 3D models are generated by associating stored average depth data for points corresponding to the co-ordinates of the feature points and further points whose position is identified relative to the co-ordinates of the feature points. The 3D models are then used to generate images which are displayed on the mobile phones.

9 Claims, 7 Drawing Sheets

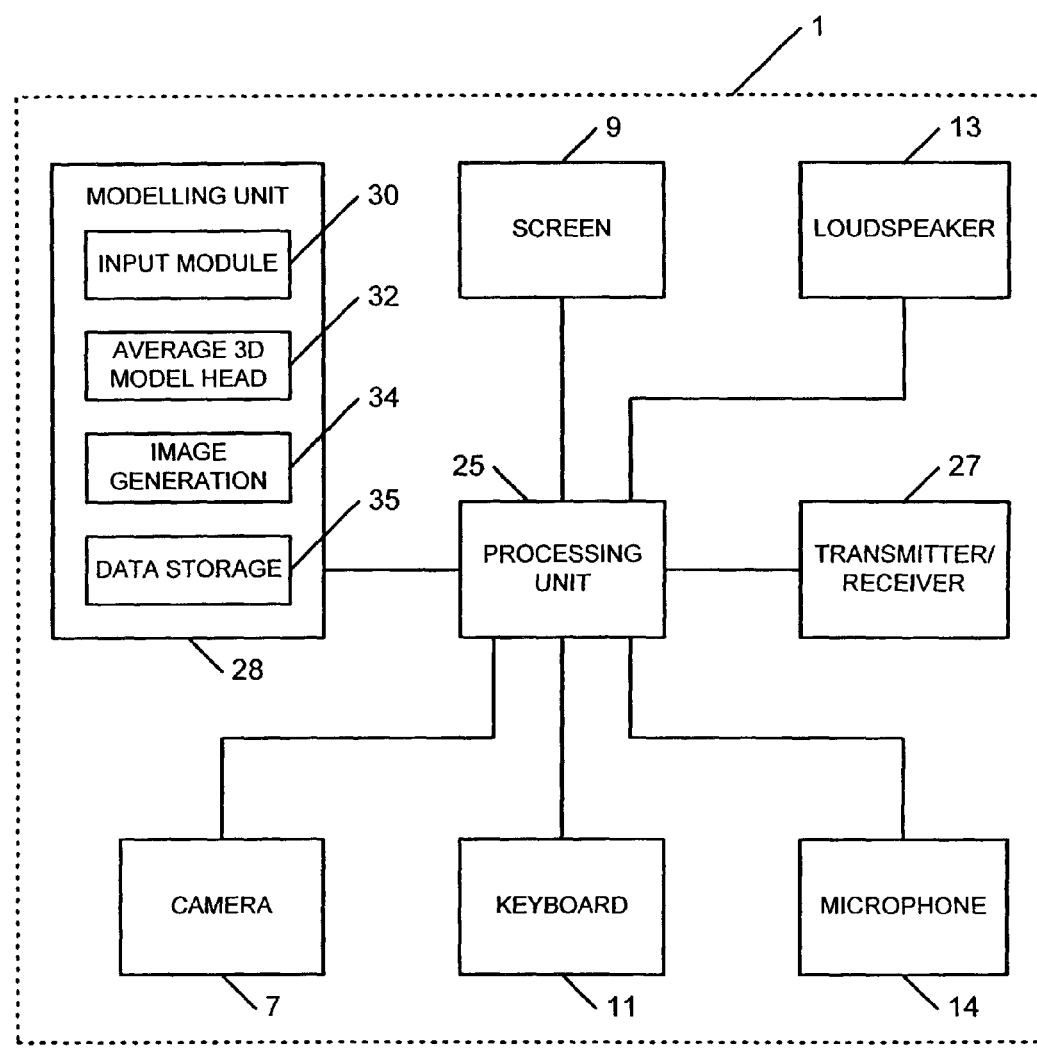

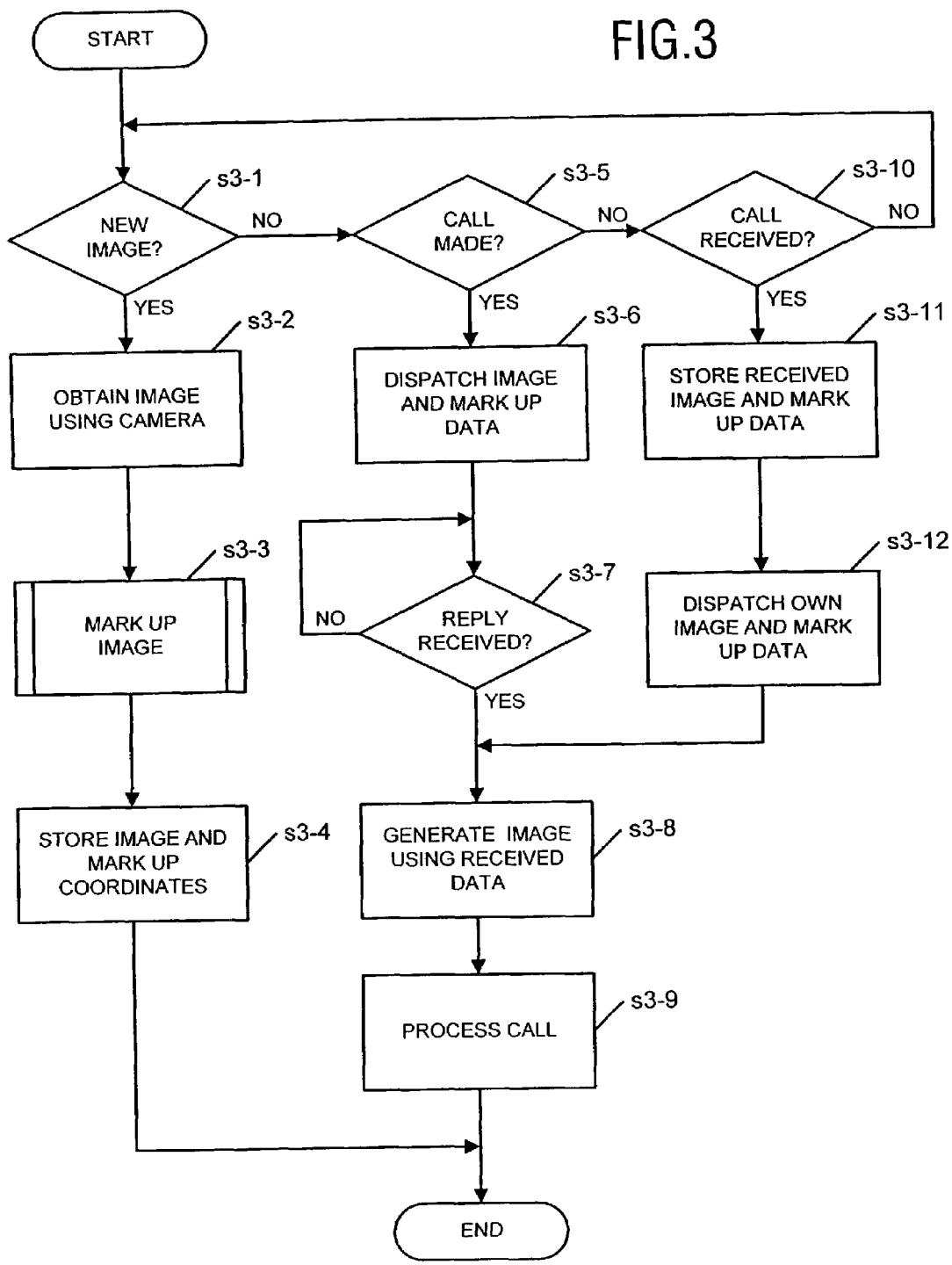

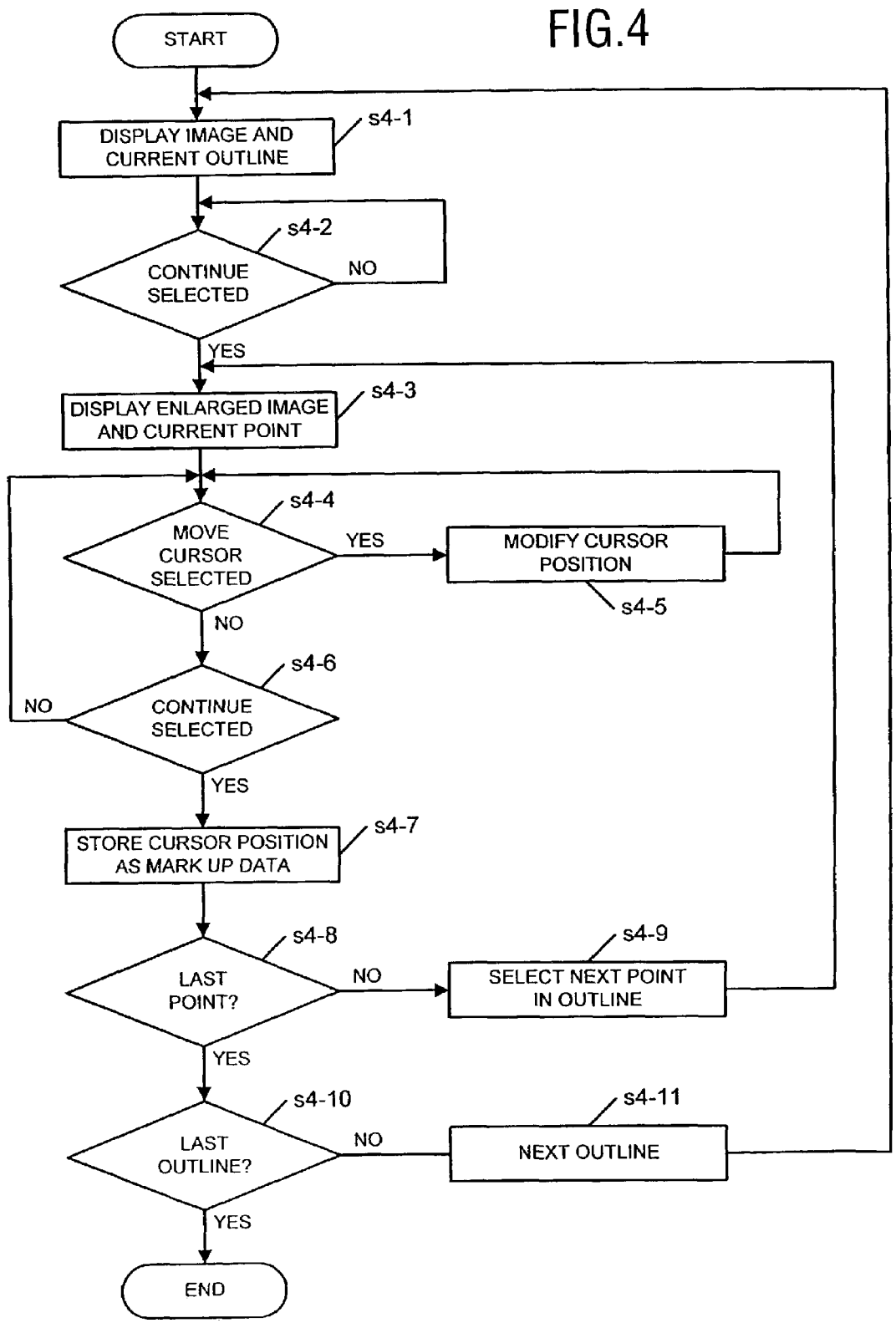

METHOD AND APPARATUS FOR GENERATING MODELS OF INDIVIDUALS

The present application relates to methods and apparatus for generating models of individuals. In particular, embodiments of the present application relates to methods and apparatus for modelling individuals for display on mobile phones.

There are many applications for computer systems that are able to generate recognisable images of individuals. These applications range from systems for displaying the face of a caller on a telephone through to computer graphics generated within computer games. Although model-based methods for representing faces exist, existing methods require a relatively large amounts of processing power which is typically not available within a mobile phone.

One known method of modelling human faces is using principle component analysis. In order to generate a model of the way in which faces vary, a large data set of different faces is first obtained. Feature points on the faces are then identified so that an average face can be determined. The manner in which each individual face used to generate the model varies from this average face can then be calculated and the results subjected to principle component analysis to determine the most significant ways in which faces within the data set vary.

By generating a model of an individual face using a limited number of the most significant variations, a reasonable approximation of a specific individual face then can be generated.

Although a computer model derived from principle component analysis of a large number of faces can be used to form a relatively compact representation of a particular person, significant amounts of processing are still required to enable an individual face to be modelled. It is therefore desirable to provide a method of generating models of individuals which requires less processing and hence is more suitable for lower capability devices such as mobile phones. Further it is desirable that a model of an individual face can be generated quickly and easily.

In accordance with one aspect of the present invention there is provided apparatus for generating 3D models of individuals comprising:

a data store storing depth data for a plurality of points on the surface of a generic individual;

an identification unit operable to identify 2D co-ordinates of features of individuals in images; and a modelling unit operable to generate a 3D model of an individual in an image utilising identified 2D co-ordinates of features of said individual of an image and depth data for points on the surface of a generic individual corresponding to said features for which 2D co-ordinates have been identified.

In accordance with another aspect of the present invention there is provided a communications system comprising a plurality of remote mobile terminals, each of said remote terminals comprising means for generating a user interface enabling users to identify positions in images as feature points, the remote terminals being operable to utilise positions identified by users utilising said user interface to generate 3D models of individuals in said images.

Further aspects of the present invention will become apparent with reference to the accompanying drawings in which:

FIG. 2 is a schematic block diagram of a mobile phone of FIG. 1;

FIG. 3 is a flow diagram of an overview of the processing of data by the mobile phone of FIG. 2;

FIG. 4 is a flow diagram of the processing of the mobile phone of FIG. 2 for inputting feature point data;

FIRST EMBODIMENT

Figure 1:
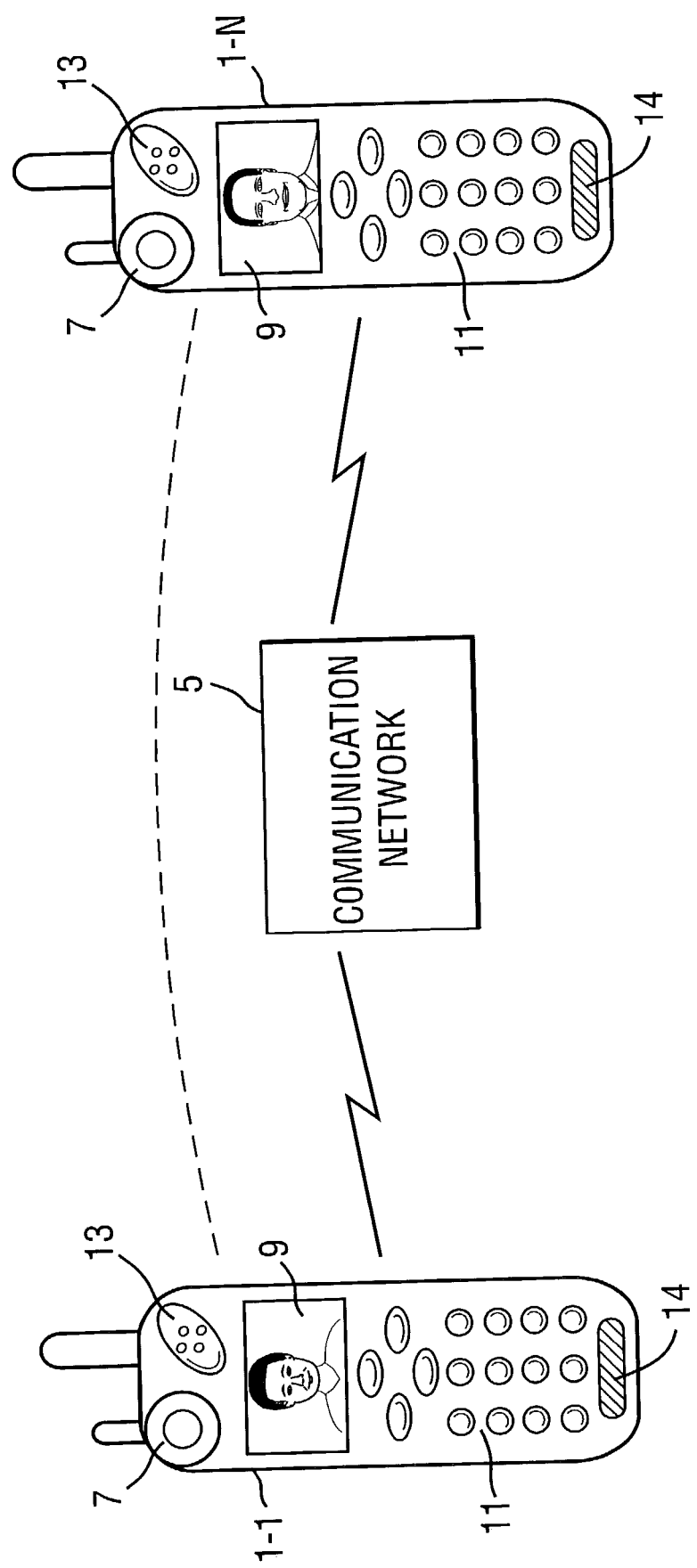
FIG. 1 is a schematic block diagram of a communications network including a pair of mobile phones in accordance with a first embodiment of the present invention.

FIG. 1 is a schematic block diagram of a communications network system. The communications system comprises a plurality of mobile phones 1-1-1-N that are connected to each other via a communications network 5. In accordance with this embodiment of the present invention, each of the mobile phones 1-1; 1-N is adapted to enable images generated from a 3D model of a caller to be displayed and comprises a camera 7 for taking pictures of the user of the phone 1-1; 1-N; a screen 9 for displaying images of the face of an individual calling the mobile phone 1-1; 1-N generated from a 3D model of the caller, a keyboard 11, a loudspeaker 13 and a microphone 14.

As will be described in detail later, the mobile phones 1-1-1-N in accordance with this embodiment of the present invention are each adapted to enable users to identify feature points in images taken using cameras 7 of the phones 1-1-1-N. The images of users and the co-ordinates of feature points in the images are then transmitted via the communications network 5 when a telephone call is made. Upon receipt of an image and the co-ordinates of feature points within an image, the mobile phones 1-1-1-N utilises the received image and feature point co-ordinates to generate a three dimensional model of the individual making the call which is then used to generate images of the caller.

Although it is desirable to enable mobile phones to generate three dimensional model images of callers, the limited processing capabilities of mobile phones render many conventional modelling techniques unsuitable. The applicants have appreciated that processing for identifying feature points can be avoided by providing a user interface which enables users to identify feature points in images themselves. The elimination of the need for automatic processing of images to identify feature points significantly reduces the amount of processing capability required.

The structure of mobile phones 1-1-1-N in accordance with this embodiment of the present invention will now be described in greater detail with reference to FIG. 2.

FIG. 2 is a schematic block diagram of a mobile phone 1 for use in accordance with this embodiment of the present invention.

In this embodiment, each of the mobile phones 1-1-1-N comprises a processing unit 25 which is connected to the keyboard 11, the camera 7, the screen 9, the loudspeaker 13 and microphone 14 of the phone 1. In addition the processing unit 25 is also connected to a transmitter/receiver 27 and a modelling unit 28.

In this embodiment, the modelling unit 28 has stored within it an input module 30 for coordinating the input of feature point co-ordinates as will be described in detail later; an average 3D model head 32 being three dimensional co-ordinates for a wire mesh model of an average head; an image generation module 32 for processing images and feature point co-ordinates with the average model head 32 to generate a three dimensional image of a caller on the screen 9; and a data storage section 35 for storing images and feature co-ordinates.

The applicants have appreciated much of the processing required for generating 3D models of heads of individuals arises due to the need to process images of those individuals to identify features in the images which are then subsequently processed so that a 3D model of a head can be created. The applicants have further appreciated that the processing of images to identify features can be avoided by instead providing a means by which features can be indicated by a user utilizing the available keyboard 11 on a mobile phone 1.

Additionally, the applicants have appreciated that provided the basic features of a face are reasonably accurately modelled so that eyes appear recessed and a nose protrudes from the rest of the face etc, the fact that a generated model is not a highly accurate 3D model of a particular individual is not apparent. This is the case for any size and resolution of screen but is particularly the case where a screen is small in size and generated images are of limited resolution as is currently the case for a screen 9 of a mobile phone 1.

Thus in this embodiment, in addition to reducing processing by avoiding automated feature matching, the modelling of individual heads is further simplified by assigning depth values for different parts of an individual's head corresponding to the death values for an average head. Thus for example the tip of an individual's nose is assigned a depth value for the average depth value for people's noses, the eyes of an individual are assigned depth values for the average extent of recesses of people's eyes. Thus as will be explained in detail, in this way, processing by way of principle component analysis is avoided whilst reasonable approximations of 3D models of individuals are generated. These generated models provide surprisingly, acceptable representations of individuals.

The processing of data by the processing unit 25 and image generation module 30 of a mobile phone 1-1; 1-N in accordance with this embodiment of the present invention will now be described in detail with reference to FIG. 3.

The processing unit 25 initially (s3-1) determines whether any data has been input via the keyboard 11 indicating that the user of the phone 1 wishes to generate a new face model for storage within the memory 28 of the phone 1.

If this is the case, the processing unit 25 then (s3-2) causes a prompt to appear on the screen 9 of the phone 1 requesting the user to take a photograph of themselves using the camera 7 of the phone 1.

When data has been entered and an image obtained using the camera 7 co-ordinates for features in the image are then entered by a user(s3-3) as will now be described in detail with reference to FIGS. 4, 5A and 5B.

FIG. 4 is a flow diagram of the processing of the input module 30 for inputting co-ordinates of features appearing in an image obtained using the camera 7 of the phone 1. In this embodiment, the input module 30 is such to generate user interfaces to enable a user to identify features and hence avoids the need for the presence of an automatic feature identifier. The input module 30 is invoked by the processing unit 25 after an image of a user has been obtained (S3-2). Initially (S4-1) the input module 30 causes the image obtained by the camera 7 to be displayed on the screen 9 with a set of control points being superimposed on the image.

Figure 5A:
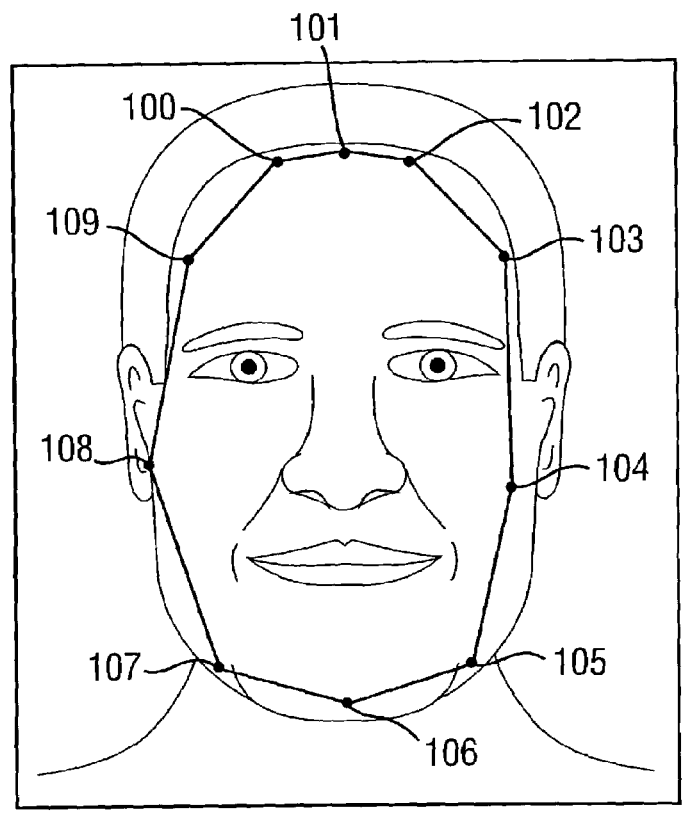
FIGS. 5A-5B are exemplary illustrations of the input of feature point data.

FIG. 5A is an illustrated example of an image of a face with a set of control points 100-109 being superimposed upon the image. In this embodiment, initially ten control points 100-109 are shown positioned approximately around the outer edge of the face.

The input module 30 then (S4-2) waits until the processing unit 25 detects that the continue button has been selected on the keyboard 11. When this is detected the input module 30 causes an enlarged portion of the previously displayed image to be displayed (S4-3) on the screen 9 where the portion selected comprises a portion centred on the next point for which feature co-ordinate data is to be entered.

Figure 5B:
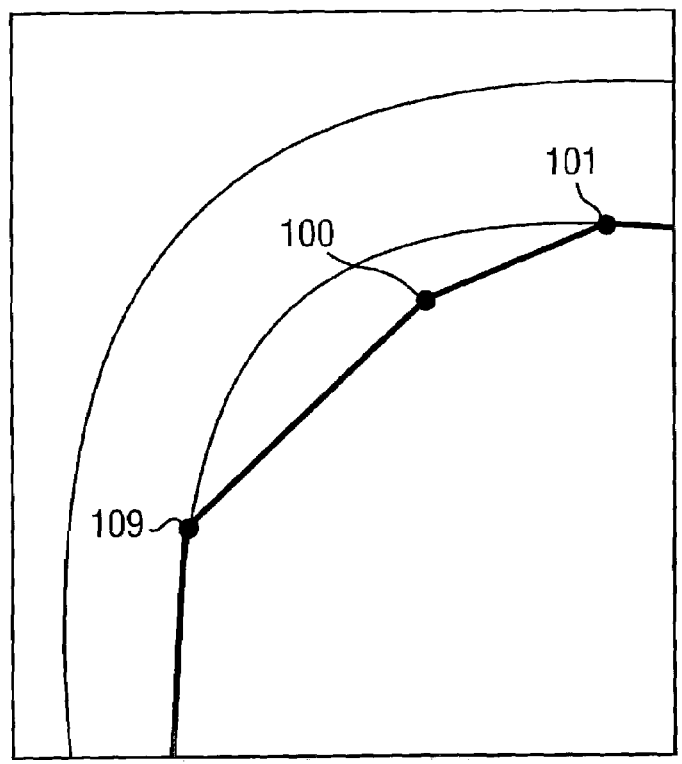

FIG. 5B is an exemplary illustration of an enlarged portion of the top left corner of the image of FIG. 5A. In the centre of FIG. 5B there is shown a control point 100.

The input module 30 then (S4-4) determines whether the user has pressed on the keyboard a button associated with movement of a cursor. Such a button can either be one of the buttons on the number keypad or a dedicated cursor control button on the keyboard 11. If this is the case the input model 30 then (S4-5) modifies the image on the screen 9 moving the control point 100 in the centre of the screen in the direction indicated by the selected button. The input model 30 then determines once again whether a move cursor button has been selected (S4-4).

Thus in this way a user is able to alter the position of the control point 100 relative to the image of the user obtained by the camera 7 and displayed on the screen 9 of the phone 1 so that the user can cause the control point 100 to be matched with a feature on the image. Thus in the case of control point 100 shown in FIG. 5B which is intended to be a control point identifying one of the points of the outside edge of a face a user would move the cursor and the control point 100 so that it matches up with the edge of the face.

If the input model 30 determines that a move cursor button has not been selected (S4-4) the input model 30 then determines whether a continued button has been selected (S4-6). If this is not the case, the control module checks once again whether the cursor button has been selected (S4-4).

If the control module 30 determines the continue button has been selected (S4-6) the input module 30 then stores data identifying the co-ordinate location of the control point 100 within the data storage portion 35 of the modelling unit 28 as the co-ordinate location of a feature point on the image displayed on the screen 9. The input module 30 then (S4-8) determines whether the 'feature point' for which a co-ordinate location has been stored within the data storage section 35 of the modelling unit 28 is the last feature point on the outline. If this is not the case, the input unit 30 then (S4-9) selects the next point in the outline and then (S4-3) displays an enlarged image centred on that next point before enabling a user to alter the position of the newly selected point so that co-ordinates for that feature point may be stored within the data storage section 35 of the modelling unit 28.

Thus in this way the user is able to input using only the keyboard 11 co-ordinate data into the data storage section 35 of the modelling unit 28 for each of the feature points identified on the outline where the co-ordinates of the feature points match the position of a portion of the image displayed on the screen 9.

When co-ordinate data for all of the feature points 100-109 of an outline have been stored within the data storage portion 35 of the modelling unit 28 the input module 30 then (S4-10) determines whether the outline for which co-ordinates have just been entered is the last outline for which feature points are to be entered. In this embodiment the input module 30 is arranged to enable a user to enter co-ordinate data for the location of the outlines of a user's face, eyes, eye brows, lips and nose appearing in an image from the screen 9. Once data for the outline of an individual's face has been entered a set of control points for the outline of the next feature for which co-ordinate data has to be entered is shown superimposed on the image. By having a user enter co-ordinate data for the outline of the face initially, the relative scale of the image can be determined and hence later initial outlines can be placed in an estimated approximate position for that feature. If once co-ordinate data has been entered for an outline it is determined (S4-10) that another outline is still required the next outline is then selected (S4-11) and then a user is prompted to enter co-ordinate data for that next feature by the display (S4-3) of an enlarged image centred on the next control point for which co-ordinate data is to be entered. Thus in this way a user is prompted to enter co-ordinate data for all the outlines of the various features appearing in the image.

Returning to FIG. 3 after a user has entered co-ordinate data (S3-3) for the features in an image this data is stored together with a copy of the image of the individual in the data storage section 35 of the modelling unit 28 for later retrieval as will be discussed later.

If the processing unit 26 determines (s3-1) that a request for generating a new face model has not been entered, the processing unit 25 then (S3-5) determines whether a telephone number has been entered using the keyboard 11. If this is the case, the mobile phone then connects to the phone 1-1; 1-N identified by the telephone number via the communications network 5 in a conventional manner. The mobile phone 1 then transmits (S3-6) via the communication network 5 image data and feature co-ordinates currently stored in data storage section 35 of the modelling unit 28.

The processing unit 25 then waits (s3-7) until a reply is received from the telephone being called via the communication network 5 and the transmitter/receiver 27. When a reply is received the reply will include image data and feature co-ordinates from the telephone being called. The processing unit 25 then passes the image data and feature co-ordinates to the image generation module 34 which then processes them using the average 30 head model 32 data stored within the modelling unit 32 to generate (s3-8) an image of the receiver of the call which is displayed on the screen 9.

Figure 6:
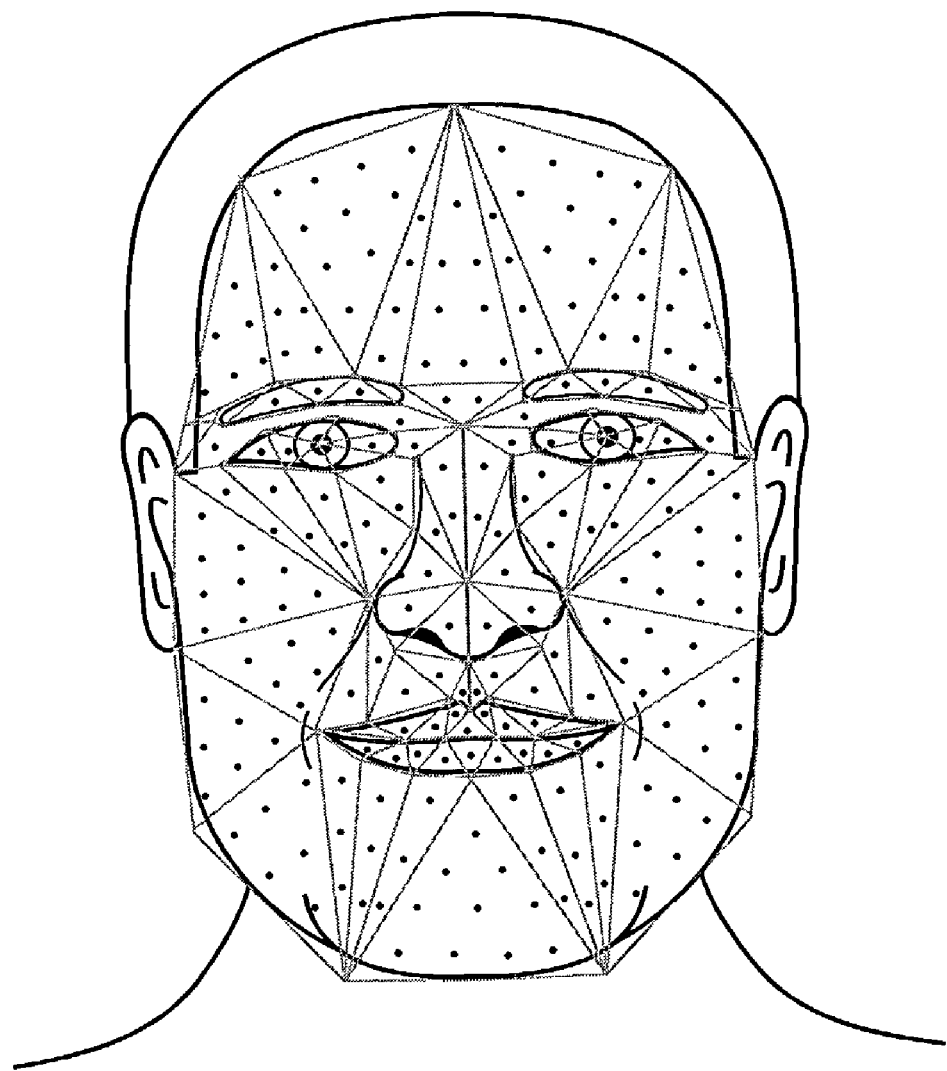
FIG. 6 is an exemplary illustration of the association of points in image with depth data.

Specifically, the co-ordinates of features received via the transmitter receiver 27 are first utilized to define a sparse triangulation of the image received via the transmitter receiver 27. FIG. 6 is an exemplary illustration of a face with points outlining the shape of the face, the eyebrows, eyes, nose and mouth utilized to define a sparse triangulation of the face. In FIG. 6 a set of control points corresponding to those which are entered utilizing the input module 30 as has previously been described as shown as forming a sparse triangulation illustrated in grey. This triangulation is then utilized to identify positions of dense points shown in FIG. 6 as dots within the triangles outlined in grey. Each of the control points and the dense points shown in FIG. 6 is then associated with a depth corresponding to depth values for the average 3D model head 32 stored within the modelling unit 28. A 3D model of the face of the individual in the image is then created from the wire mesh model of the three-dimensional shape of the individual utilizing all of the points in the image at which a depth has been associated.

Thus in this way, by utilizing the feature points of a face identified by a user to constrain the location of a dense matrix of points which are then associated with depth values corresponding to the average depth of those points on a three-dimensional wire mesh model of an average head, it is possible to construct a reasonable approximation of the three-dimensional characteristics of an individual in an image. Such a construction is achieved with minimal processing. Although the actual depth data for an individual's face may differ from the values assigned using this method, the limitations of such a model are not readily apparent.

Although in this embodiment, depth values are determined merely by identifying points within a mesh constrained by feature points located by an individual, in other embodiments prior to associating depth values with points processing could be performed to cope with out of image plane rotations of either the head or the three-dimensional model.

Returning to FIG. 3, once an image of a caller has been calculated and displayed (s3-8) on the screen 9 of the phone 1, the phone 1 then proceeds (s3-9) to transmit audio data received via the microphone 14 and output received audio data received via the transmitter/receiver 27 out through the loudspeaker 13 in a conventional manner.

If the processing unit determines (s3-5) that no call has been made using the keyboard 11, the processing unit 25 then determines (S3-10) whether a call has been received by the transmitter/receiver 27. If this is not the case the processing unit 25 then once again checks (s3-1) whether data indicating that a new face is to be stored within the memory 28 being input via the keyboard 11.

If the processing unit determines (s3-10) that a call has been received via the transmitter/receiver 27, the data received will include image data and feature co-ordinates. The processing unit 25 then (s3-11) stores the received image data and feature co-ordinates received via the communication network 5 and the transmitter/receiver 27 by passing this data to the data storage section 35 of the modelling unit 28.

The processing unit 25 (s3-12) then causes the image data and feature co-ordinates previously generated by a user and stored within the data storage section 35 of the modelling unit 28 of the phone 1 to be dispatched via the transmitter/receiver 27 and the communications network 5 to the phone 1 from which a call has been received. The processing unit 25 then causes the image generation module 34 to generate (s3-8) an image of the caller using the average 3D head model 34 and the image data and feature co-ordinates received from the communications network 5 as has previously been described.

Finally after an image has been displayed, the processing unit 25 causes audio data received by the microphone 14 to be transmitted via the transmitter/receiver 27 and audio data received by the transmitter/receiver 27 to be output by the loudspeaker 13 in a conventional manner (s3-9).

SECOND EMBODIMENT

A second embodiment of the present invention will now be described. Whereas in the first embodiment a system was described in which the three-dimensional modelling of faces of individuals is achieved by utilizing a pre-stored three-dimensional model of an average face and assigning depth values utilizing that average face, in this embodiment, models are generated utilizing principle component analysis as will now be described.

Figure 7:
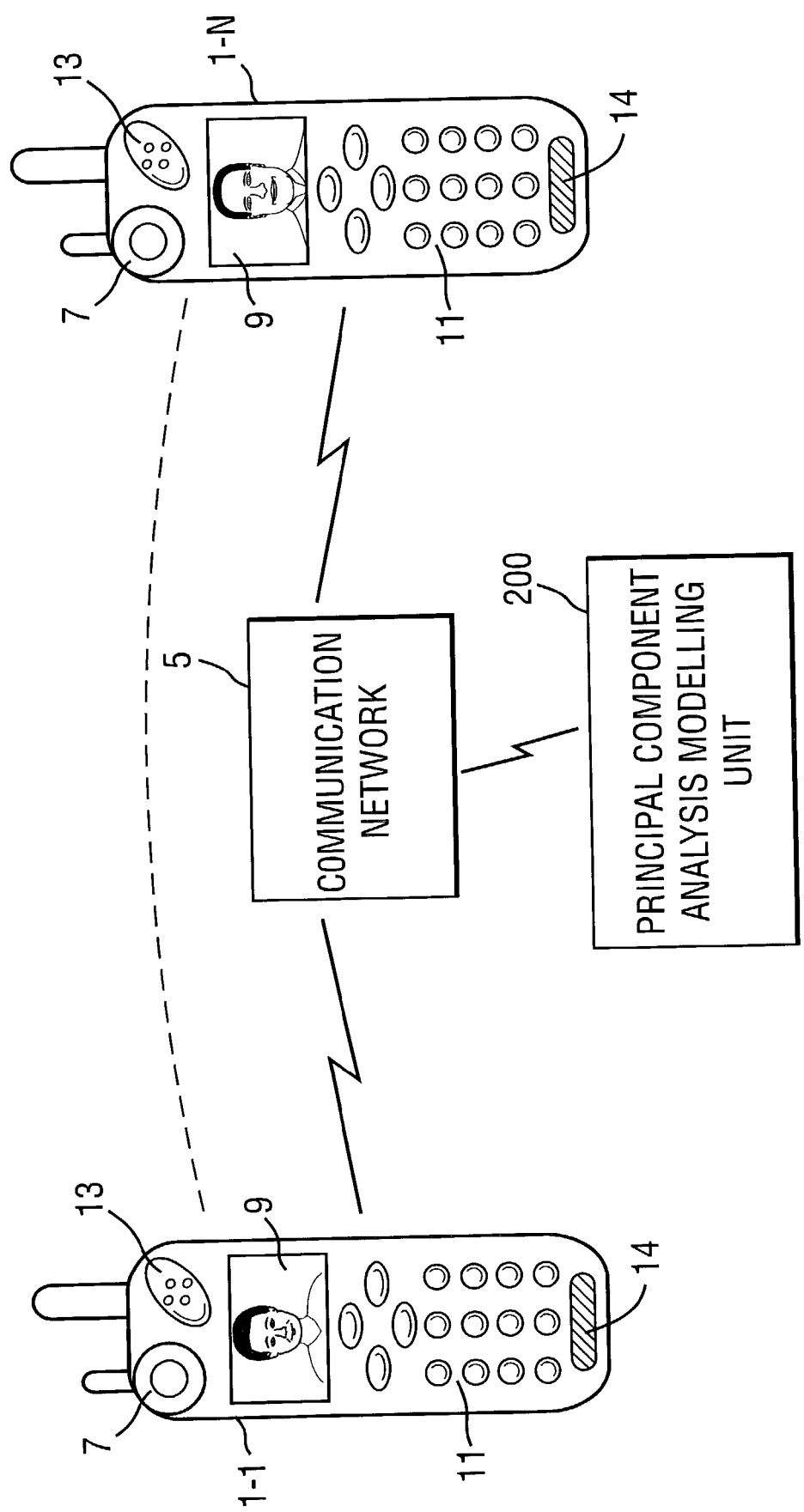
FIG. 7 is a schematic block diagram of a second embodiment of the present invention.

FIG. 7 is a schematic block diagram of a second embodiment of the present invention. This embodiment is identical to that described in the first embodiment except a principle component analysis modelling unit 200 connected to the phones 1-1; 1-N via the communications network 5 is provided. The modelling units 28 of the mobile phones 1-1; 1-N in this embodiment are also modified as will now be described.

In this embodiment, instead of storing a 3D model head 32 and co-ordinate locations of feature points entered utilizing the input module 30, the modelling unit 28, once co-ordinates and feature points have been input causes an image and the co-ordinates of the feature points to be transmitted via the communications network 5 to the principle component analysis modelling unit 200. The principle component analysis modelling unit 200 then processes the marked up images in a conventional manner to generate a principle component analysis model for representing the received image. Eigen values for a principle component analysis model of the received image generated utilizing the received image and the feature co-ordinates are then transmitted back to the mobile phone 1-1; 1-N and stored. When a telephone call is made these Eigen values are transmitted via the communications network 5 to the telephone being contacted where they are processed by the modelling unit 28 in a conventional way to generate a three-dimensional model image of the caller.

Thus in accordance with this embodiment of the present invention, data transmission via the communications network 5 at the time of making a call can be minimised as only Eigen values for a model need be transmitted via the communication network 5. The processing taking place on the mobile phones 1-1; 1-N is then minimised by the user identifying features in images which are sent to a separate principle component analysis modelling unit 200 where principle component analysis models of an individual are generated. The only processing required by the phone 1 is then the generation of an image utilising received Eigen values.

FURTHER EMBODIMENTS AND MODIFICATIONS

Although in the first embodiment images have been described as being generated using a single average 3D model head, a selection of average 3D heads for individuals of different genders and ethnic types could be stored and an appropriate head selected. It will be appreciated that other factors could be used to separate individuals into different groups. Thus for example models could be generated for individuals of different age ranges or by the presence in images of distinguishing features for example beards or glasses etc.

In such an embodiment, data identifying user characteristics such as gender and ethnicity could be entered using a keyboard 11. Alternatively other methods could be utilised. Thus for example, the average faces for different groups could be displayed on the screen 9 of a phone 1 and a user prompted to select the face most closely corresponding to their own face before sending out data for generating a model. Alternatively, type data for a user could be pre-stored in for example the SIM card for a phone 1 with data being obtained from a user when the phone is initially purchased. A further alternative would be for the modelling unit 28 to select an appropriate model head utilizing the feature co-ordinates entered by a user to identify the closest match.

The selection of a particular model head for generating depth data for an individual could alternatively be made based upon recognition of a telephone number or recognition of a caller's voice. In the case of selection based on phone number a phone might be arranged to store a database of head models used for callers from previously contacted telephone numbers so that when a telephone number is contacted again an appropriate head can automatically be selected. In a simple voice recognition embodiment, selection of a model for a caller could be made, with the frequency of a voice signal being used to select either a male or female average head as model depth data for a caller.

It will be appreciated that instead of a database of models being stored on a phone 1, a central database of models could be provided with the 3D co-ordinates for a selected model being downloaded whenever an image of a caller was to be generated. Or more generally any of the processing modules described in the above embodiments could be provided accessible via the communications network 5 rather than being incorporated within the phone 1. The processing could then either take place remotely or the modules for processing images could be downloaded onto the phone as they were required.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

Although in the above embodiments, systems for modelling faces have been described, it will be appreciated that the present invention is more generally applicable. Specifically, the present invention may be utilised to model for example whole heads rather than only faces or alternatively larger portions of an individual (e.g. head and shoulders) or even for generating full body models.

The invention claim is:

1. A mobile electronic apparatus for generating 3D models of individuals from 2D images, said apparatus comprising:
   a data store operable to store a 3D model defining relative 3D locations of a plurality of points on a surface of a generic individual;
   a feature identifier operable to process 2D images of individuals to identify a number of points in said 2D images as 2D co-ordinate locations of a number of features of said individuals in said 2D images;
   a modelling unit operable to process said 2D images of individuals and said identified 2D co-ordinate locations of features to generate 3D models of said individuals, said modelling unit being operable to generate said 3D models by associating said identified 2D co-ordinate locations of features with data indicative of relative 3D locations for said features, determined by utilising the relative 3D locations of corresponding features defined by the 3D model stored in said data store; and a communicating unit having a transmitter unit which is able to connect to a wireless network and which is operable to transmit 3D models by transmitting 2D co-ordinates and 2D images of individuals, said 2D co-ordinates being identified in said 2D images by said feature identifier.

2. Apparatus in accordance with claim 1, wherein said modelling unit is operable to process said 2D images of individuals and said identified 2D co-ordinate locations of features by identifying a plurality of points in said 2D images relative to the positions of groups of said identified 2D co-ordinate locations and to associate said plurality of points with data indicative of relative 3D locations utilising the relative 3D locations of points on the surface of a generic individual in defined positions relative to groups of said corresponding features defined by a 3D model stored in said data store.

3. Apparatus in accordance with claim 1, wherein said modelling unit is operable to generate 3D models of individuals wherein said feature identifier is operable to identify points in said 2D images corresponding to points outlining any of the face, eyes, nose, eyebrows or mouth of an individual in said 2D images.

4. Apparatus in accordance with claim 1, wherein said feature identifier comprises a user interface enabling a user to input co-ordinate data identifying 2D co-ordinate locations of said features of individuals in said 2D images.

5. Apparatus in accordance wit claim 1, wherein said data store stores a 3D model defining the relative 3D locations of an average position of a plurality of points on the surface of a group of individuals.

6. Apparatus in accordance with claim 1, wherein said data store is operable to store a plurality of 3D models defining the relative 3D locations of positions of a plurality of points on the surface of a plurality of individuals, and said modelling unit further comprises a selection unit for selecting from a plurality of 3D models stored in said data store, a 3D model to be utilised to generate a 3D model for an individual.

7. Apparatus in accordance with claim 1, wherein said modelling unit is operable to determine the orientation of an individual in an image and to process identified co-ordinate locations to determine corresponding 2D co-ordinates in a predefined plane, wherein said generation of 3D models comprises associating depth data with said 2D co-ordinates in said predefined plane.

8. Apparatus in accordance with claim 1, further comprising:

a receiver operable to receive 2D co-ordinates and 2D images of individuals, wherein said modelling unit is operable to generate models utilising data received by said receiver.

9. Apparatus in accordance with claim 8, wherein said apparatus further comprises a display, said apparatus being arranged to display images generated utilising said models generated by said modelling unit upon receipt of data by said receiver.

* * * * *